No. 887,519. PATENTED MAY 12, 1908.
H. L. REED.
MACHINE FOR STRIPPING LEAVES FROM TREES.
APPLICATION FILED JAN. 3, 1907.
2 SHEETS—SHEET 1.
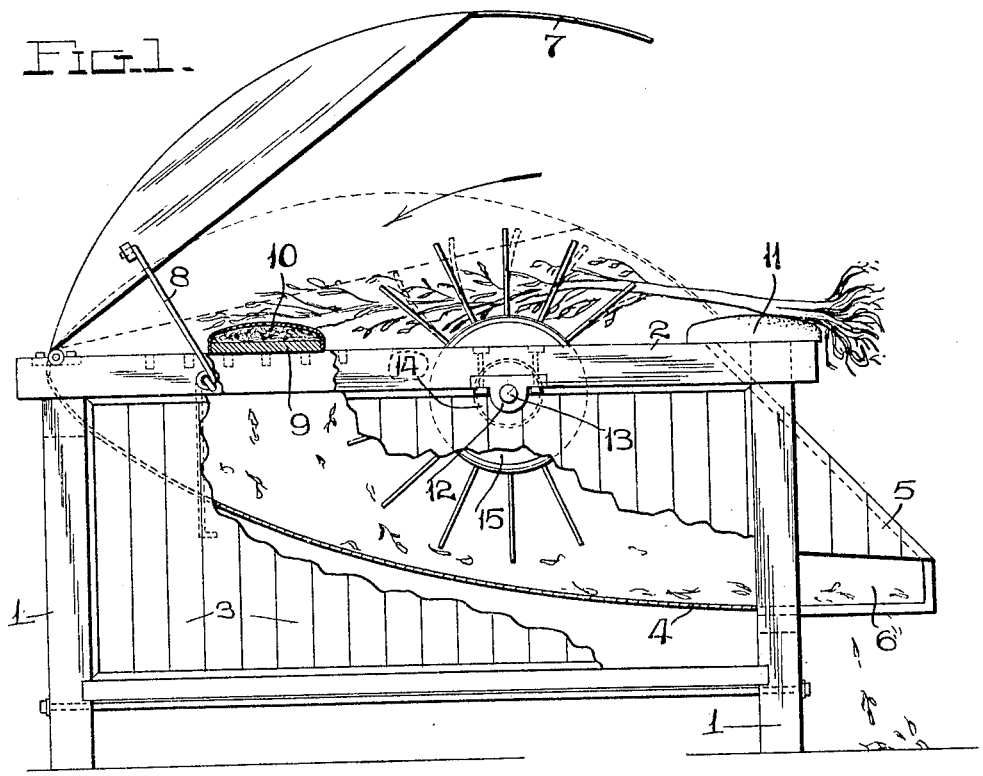
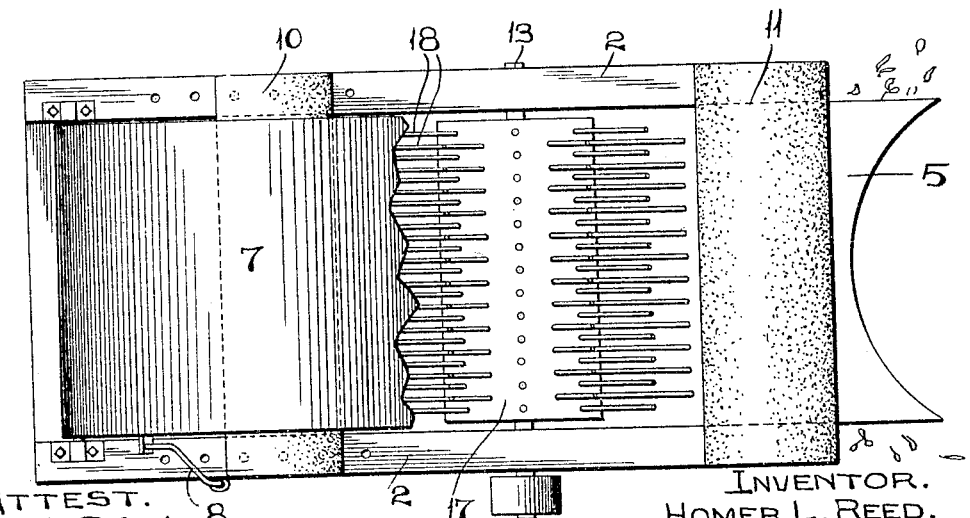
ATTEST.
H. J. Fletcher.
M. Smith.
INVENTOR.
HOMER L. REED.
BY Higdon Lougan
ATTY'S.

No. 887,519. PATENTED MAY 12, 1908.
H. L. REED.
MACHINE FOR STRIPPING LEAVES FROM TREES.
APPLICATION FILED JAN. 3, 1907.
2 SHEETS—SHEET 2.
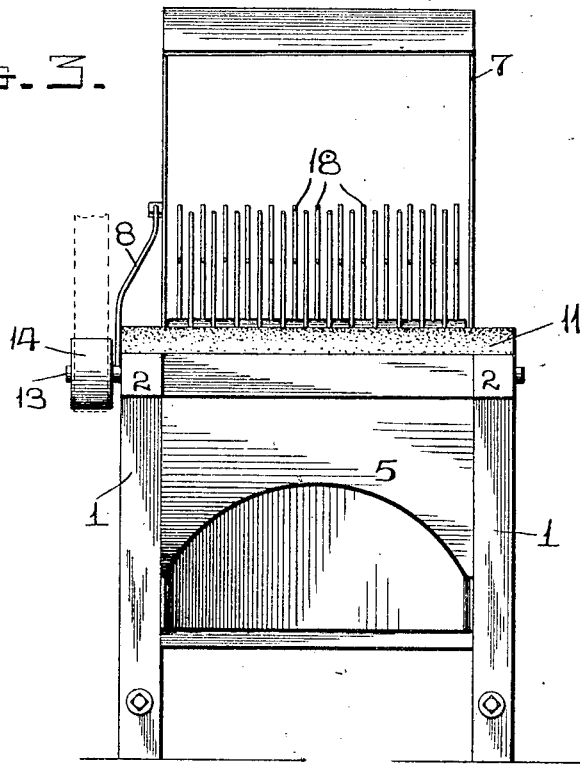
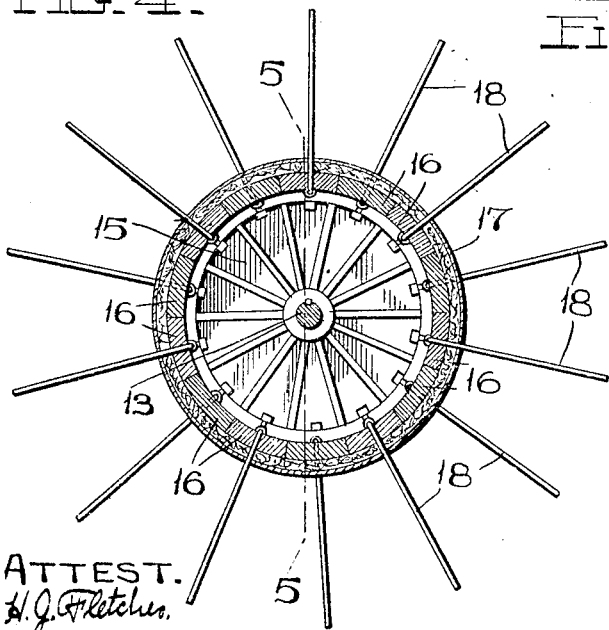
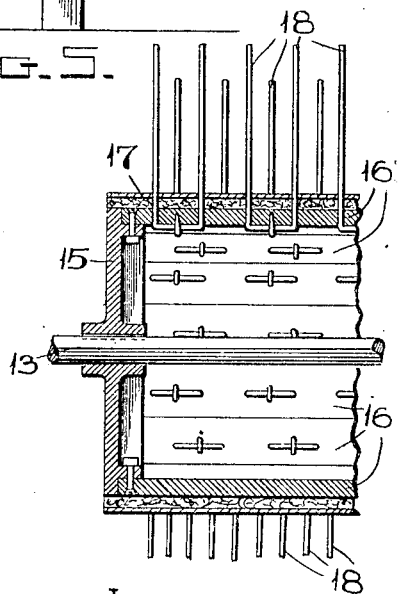
ATTEST.
H. J. Fletcher.
M. P. Smith.
INVENTOR.
HOMER L. REED.
BY Higdon Dougan.
ATT'YS

UNITED STATES PATENT OFFICE.

HOMER L. REED, OF LOUISIANA, MISSOURI.

MACHINE FOR STRIPPING LEAVES FROM TREES.

No. 887,519.  Specification of Letters Patent.  Patented May 12, 1908.

Application filed January 3, 1907. Serial No. 350,680.

*To all whom it may concern:*

Be it known that I, HOMER L. REED, a citizen of the United States, and resident of Louisiana, Pike county, Missouri, have invented certain new and useful Improvements in Machines for Stripping Leaves from Trees, of which the following is a specification containing a full, clear, and exact description, reference being had to the accompanying drawings, forming a part hereof.

My invention relates to a machine for stripping leaves from trees, and the object of my invention is to provide a simple, strong, and durable machine which may be easily operated, and which will quickly and efficiently remove the leaves from small trees and shrubs, plants and vines.

My improved machine is particularly adapted for the use of nurserymen, and is to be used for stripping the leaves of trees immediately after they are taken up for transplanting, it being essential that the leaves be removed in order to prevent shriveling of the trunk and branches of the tree or shrub.

To the above purposes, my invention consists in certain novel features of construction and arrangement of parts, which will be hereinafter more fully set forth, pointed out in the claims, and illustrated in the accompanying drawings, in which:—

Figure 1 is a side elevation of my improved machine, parts thereof being broken away and in section; Fig. 2 is a plan view of the machine with a portion of the hood broken away; Fig. 3 is a front elevation of the machine; Fig. 4 is a cross section taken through the center of the whip carrying cylinder I make use of in carrying out my invention; Fig. 5 is a vertical section taken on the line 5—5 of Fig. 4.

In the construction of my improved machine, I make use of a rectangular framework comprising four corner posts 1, which are suitably braced together, and supported by the upper ends thereof are the longitudinally extending timbers 2. The sides of the frame so formed are inclosed by suitable panels 3, and extending from the rear upper corner of the frame, forwardly, between the front posts 1, is a curved bottom plate 4, preferably formed of sheet metal, such as galvanized iron, and said bottom 4 extends in front of the front pair of posts 1 a short distance, and there is a housing 5 formed over said extension, in the sides of which housing are formed the discharge openings 6.

Hinged to the top side and rear of the frame of the machine is a hood 7, which, when the machine is in operation, is elevated, as shown in Figs. 1 and 3, and so supported by means of a hook 8 attached to one of the timbers 2, and engaging a perforated lug formed on the side of the hood.

Adjustably mounted on top of the timbers 2, adjacent their rear ends, is a transversely arranged supporting pad, comprising a bar 9, the top of which is padded, as designated by 10. This adjustable pad is provided for the purpose of sustaining the top of the tree while the leaves are being stripped therefrom, and fixed on the forward ends of the timbers 2 is a supporting pad 11, which is for the purpose of supporting the base of the trunk of the tree while the leaves are being removed therefrom.

Fixed to the under sides of the timbers 2 and between the pads 10 and 11 are journal boxes 12, in which is arranged for rotation a shaft 13, on the left hand end of which is mounted a pulley 14, and fixed on this shaft between the sides of the frame are circular heads 15, to the edges of which are bolted transverse segments 16, thus forming a hollow cylinder. The exterior surface of this cylinder is preferably padded, as designated by 17, and fixed to the segments 16, in any suitable manner, are whips 18, formed of raw hide, or analogous tough, flexible material.

When my improved machine is in operation, the shaft 13 and cylinder carrying the whips 18 are driven in the direction indicated by the arrow in Fig. 1, by means of a driven belt applied to the pulley 14, and when the proper speed has been obtained, which for all practical purposes should be from 800 to 1,000 revolutions per minute, the trees or shrubs from which the leaves are to be removed are sucsesively engaged by an operator who stands immediately in front of the machine, and said trees or shrubs are positioned on the padded supports 10 and 11.

The whips 18 carried by the cylinder normally stand out in radial lines, owing to centrifugal force, and as said whips move very rapidly, the leaves on the tree or shrub will be very quickly removed from the branches and twigs as the tree is manipulated by the operator, which operation does not break or injure the branches or twigs of the trees or shrubs, but merely strips the leaves therefrom, which latter are thrown downwardly onto the curved bottom 4, and discharged through the openings 6 at the front of the machine.

The parts 10 and 11 are provided for supporting the tree while the leaves are being stripped therefrom, and said parts and the surface of the cylinder are padded in order to prevent injury to the trunk and branches of the tree or shrub while being passed through the machine.

The whips 18 traveling at a high rate of speed very quickly and efficiently remove the leaves, and thus leave the trees or shrubs in proper condition for shipment or storage prior to being transplanted.

A machine of my improved construction is light, strong and durable, easily operated, and very quickly and efficiently strips the leaves from all kinds of small trees and shrubs.

I claim:—

1. In a machine of the class described, a frame, a member arranged for rotation therein, a pad located on the surface of said member, a series of whips carried by the member, and padded members fixed on the frame for supporting a tree over the rotating member.

2. In a machine of the class described, a frame, a member arranged for rotation therein, a pad located on the surface of said member, a series of whips carried by the member, padded members fixed on the frame for supporting a tree over the rotating member, and a hood carried by the frame over the rotating member.

3. The herein described machine for stripping leaves from trees, comprising a frame, a cylindrical member arranged for rotation in the frame, and which member is adapted to support a portion of the tree to be stripped, a pad completely enveloping the periphery of said rotating member, and a series of flexible non-elastic lashes carried by the rotating member.

In testimony whereof, I have signed my name to this specification, in presence of two subscribing witnesses.

HOMER L. REED.

Witnesses:
ED. W. STARK,
J. D. MERIWETHER.